United States Patent [19]

Wiley

[11] Patent Number: 4,730,952
[45] Date of Patent: Mar. 15, 1988

[54] QUICK CHANGE MECHANISM FOR CIRCULAR SAW BLADES

[76] Inventor: Edward R. Wiley, 4259-144th La. SE., Bellevue, Wash. 98006

[21] Appl. No.: 893,230

[22] Filed: Aug. 4, 1986

[51] Int. Cl.⁴ ............................ B25G 3/00; F16B 7/00
[52] U.S. Cl. ..................................... 403/316; 403/349; 403/359; 30/388; 83/665
[58] Field of Search ............... 403/348, 349, 359, 316, 403/317; 30/388, 391; 83/665, 666

[56] References Cited

U.S. PATENT DOCUMENTS

| | | | |
|---|---|---|---|
| 1,792,363 | 2/1931 | Dehuff | 403/348 |
| 1,818,261 | 8/1931 | Koch et al. | 403/349 X |
| 4,205,572 | 6/1980 | Weiner | 30/388 X |
| 4,657,428 | 4/1987 | Wiley | 403/359 |

FOREIGN PATENT DOCUMENTS

| | | | |
|---|---|---|---|
| 2527404 | 1/1976 | Fed. Rep. of Germany | 403/349 |
| 744160 | 6/1980 | U.S.S.R. | 403/359 |

Primary Examiner—Andrew V. Kundrat
Attorney, Agent, or Firm—Roy E. Mattern, Jr.

[57] ABSTRACT

To eliminate the need for using a hand wrench or another hand tool to remove lock nuts, screws, or other fasteners, to be able thereafter to remove a circular saw blade from a powered hand or table saw, this quick change mechanism is installed on the shaft or arbor of the powered saw. There is a preassembly of: a splined and grooved circular saw blade holder; a complementary splined slide lock with upwardly extending spline finger, for axially sliding on the blade holder; an installation bolt passable down through this blade holder and this slide lock, having an axial spring receiving cavity in a tapered head, also having an allen wrench receiving cavity; a coiled spring to be received in this cavity; and a release button with depending spring legs terminating in feet for passing about this coiled spring and down alongside the blade holder, via grooves formed in the spline recesses of this blade holder. These spring legs also pass inside the slide lock's upwardly extending spline fingers, until the feet thereof radially extend, under the spring force of these legs, to enter respective slots formed on the inside of these upwardly extending spline fingers, until the feet thereof radially extend, under the spring force of these legs, to enter respective slots formed on the inside of these upwardly extending spline fingers to complete this preassembly of the essential components of this quick change mechanism for circular saw blades.

6 Claims, 6 Drawing Figures

U.S. Patent  Mar. 15, 1988  Sheet 1 of 3  4,730,952
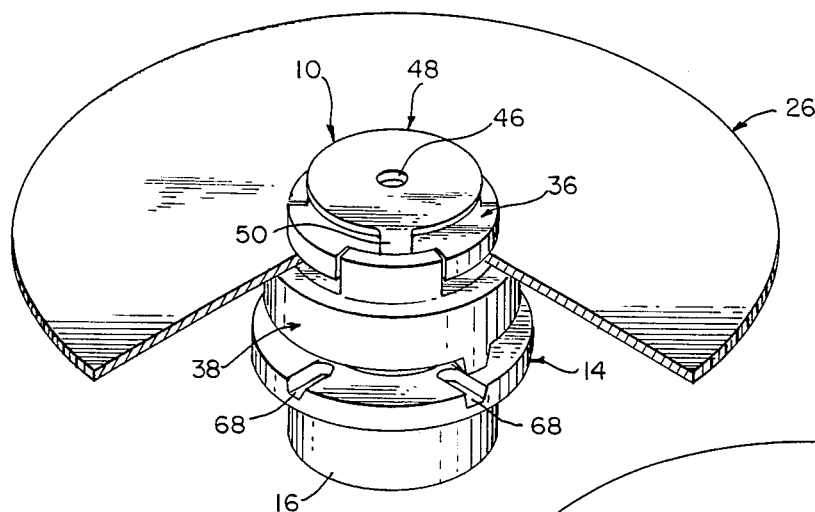
FIG. 1
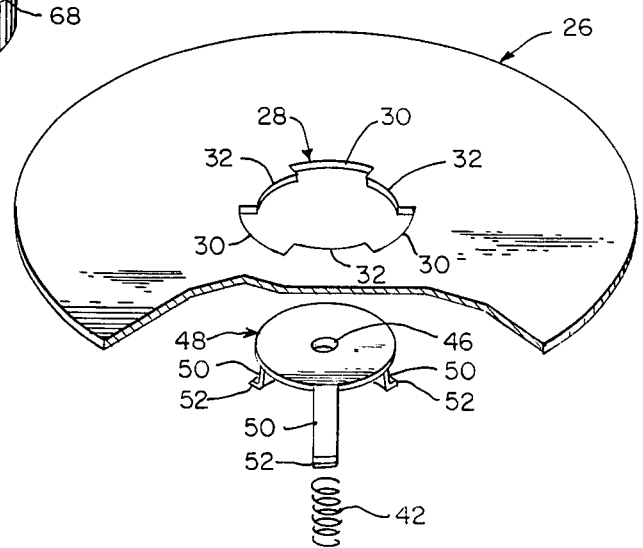
FIG. 2
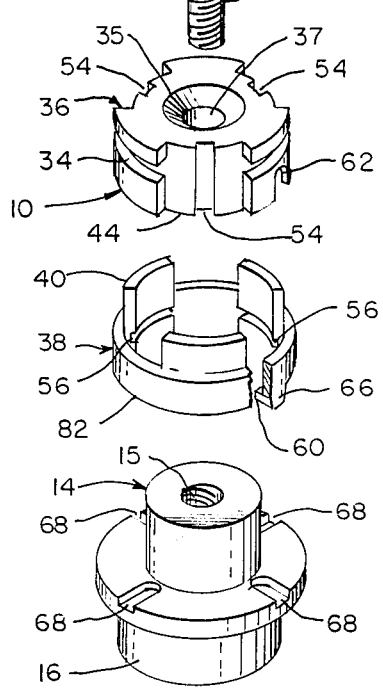

QUICK CHANGE MECHANISM FOR CIRCULAR SAW BLADES

CROSS REFERENCES

The Applicant has a copending application Ser. No. 774,331, filed 9/10/85 now U.S. Pat. No. 4,657,428 entitled "Quick Change Mechanism for Circular Saw Blades and Other Spinning Disc Devices", and portions of the application Ser. No. 06/774,331 are incorporated in this application to better understand the purpose of these quick change mechanisms.

BACKGROUND OF THE INVENTION

This invention relates to mechanism for attachment and removal of circular saw blades on both motor driven hand held saws and stationary table saws. Also such mechanism handles other disc tool heads such as grinder wheels, sander discs and buffers.

Blade changes on power circular saws now on the market generally require the use of two tools, one tool to hold the blade, the other tool to unscrew the nut or bolt which holds the blade on the shaft of the saw. One brand of hand saw has a mechanism for locking the drive gears which eliminates the tool for holding the blade. However, they all have at least two or three nuts, bolts and washers which are removed from the shaft in a blade change operation. This is particularly inconvenient in a cluttered workplace, where special tools provided by the saw manufacturer and/or removable parts are often lost. Today, at least ten special purpose saw blades are sold for use in cutting different materials and for different cutting results in the same material. To obtain best results the appropriate cutting blade should be used. When blade changes are difficult, time consuming, or when special tools are misplaced, blade changes are postponed or not done at all. Therefore there is a need for having a mechanism which is used to more quickly attach and remove circular saw blades, etc. and which is retrofitted to existing hand held power saws and table saws.

SUMMARY OF THE INVENTION

This quick change mechanism enables a user of a power saw to perform circular saw blade installations and removals in a few seconds of time, without using any tools. This mechanism is provided initially when a power saw is manufactured, or the mechanism is provided with retrofit instructions and/or accessories. The circular saw blades will have a splined center blade arbor hole, or be fitted with an accessory to provide such a hole. Also the power saw will have the arbor or drive shaft end complementary fitted by the installation bolt of the preassembly of this quick change mechanism. Moreover, the drive shaft or arbor bearing bushing will be notched or will be equipped with a locking notch accessory.

The preassembly includes the axial assembly of: a splined blade holder; a splined slide lock with extending spline land fingers; the installation bolt; coiled spring; and a release button with depending spring legs and feet, which hold this preassembly together. The splined blade holder has a locking groove to receive the lands of the splines of the circular saw blade.

During the final assembly, the extending spline land fingers of the splined slide lock are depressed out of the way, against the coiled spring force, upon the installation of the circular saw blade, as the lands thereof are aligned with these spline land fingers of the splined slide lock and the spline grooves of the splined blade holder. Then upon reaching the locking grooves of the splined blade holder, the circular saw blade is rotated, so the spline lands thereof enter these locking grooves. Then to insure the maintenance of their locking position, the splined slide lock moves under the coil spring force to carry the spline land fingers back into the grooves of the splined blade holder.

Relative radial motion between the splined blade holder and the splined slide lock is prevented by the engagement of a travel limiting stud on the splined slide lock with the travel limiting notch on the splined blade holder. Also limited relative axial motion between the splined blade holder and the splined slide lock is controlled, by also using this engagement or interfitting of the travel limiting stud on the splined slide lock with the vertically orientated travel limiting notch on the splined blade holder.

Only when the release button is depressed, will an arbor lock lug on the splined slide lock engage the closest arbor locking notch of a group of them provided in the drive shaft or arbor bearing bushing, or provided by an attached accessory having such arbor locking notches. Such engagement keeps the drive shaft or arbor from rotating, when a circular saw blade is being secured or released.

Just as soon as the circular saw blade is secured in the locking groove, the release button and the splined slide lock are moved, via the coil spring force, and the arbor lock lug is cleared of the respective arbor locking notch. The arbor lock lug likewise remains clear of all such arbor locking notches during the operation of the power saw.

After the first installation of this preassembly using the installation bolt, the user of the power saw rapidly changes circular saw blades by manipulating only the respective circular saws and the release button, in either on or off motions using one's fingers and hands in a few seconds of time.

DRAWINGS

This quick change mechanism for circular saw blades is illustrated in the drawings wherein:

FIG. 1 is a perspective view of the quick change mechanism, as assembled in a ready to be used position, when this mechanism has been used in mounting a circular saw blade on a drive shaft or arbor of a power saw, showing the arbor, the arbor bearing bushing, but not illustrating the balance of the power saw components;

FIG. 2 is a perspective exploded view of the quick change mechanism components, illustrated in FIG. 1, including the arbor, saw shaft, or drive shaft, and the bearing bushing of the drive shaft, saw shaft, or arbor;

Figure 3:
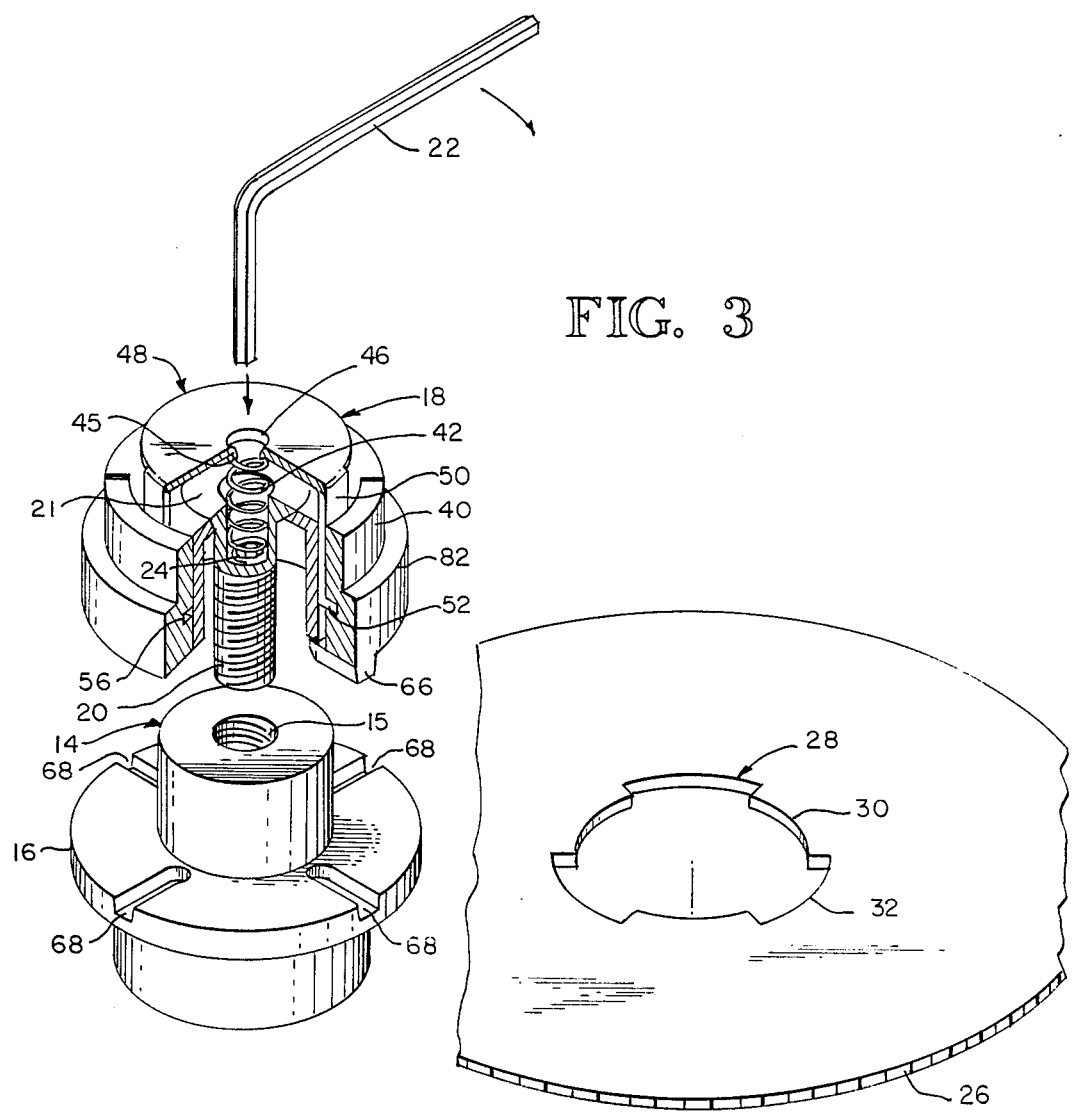
Figure 4:
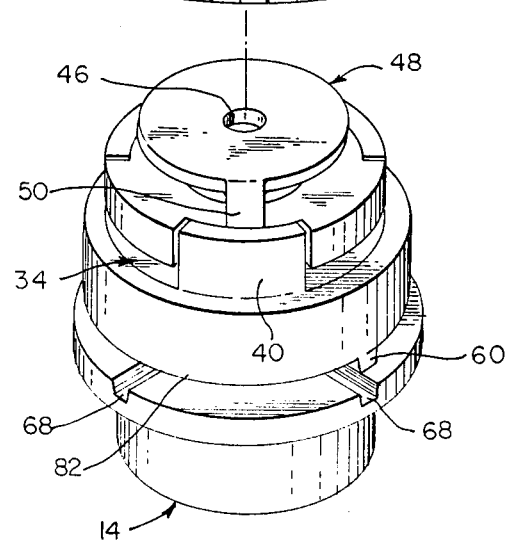
Figure 5:
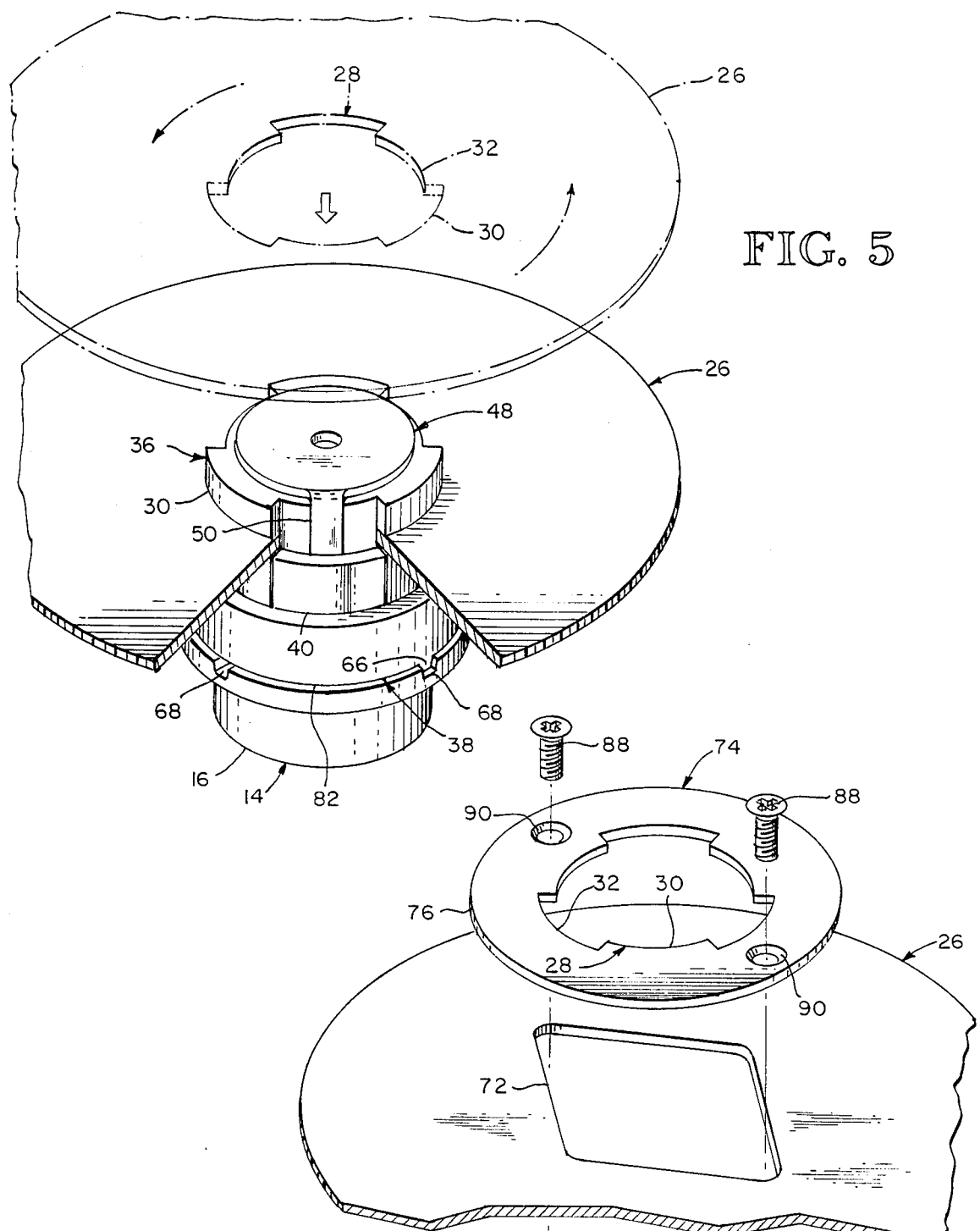
Figure 6:
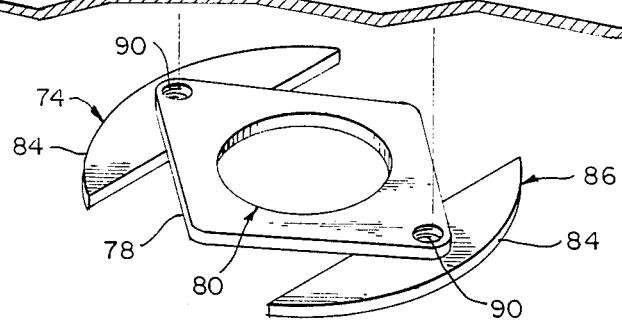

FIG. 3 is a perspective view, with portions broken away, to illustrate how the preassembled quick change mechanism is about to be secured to the saw drive shaft by turning and tightening the installation bolt, using an allen wrench, and also to show the installation bolt head, which receives the end of a coil spring, and moreover to illustrate the subassembly of the release button with the splined blade holder and the splined slide lock;

FIG. 4 is a perspective view of the quick change mechanism mounted on the drive shaft or arbor of as power saw, awaiting the quick installation of the circular saw blade to be lowered, turned, and locked into place;

FIG. 5 is a perspective view of the quick change mechanism, as shown in FIG. 4, following the lowering and then the limited rotating of a circular saw blade, to position the lands of the saw blade in the locking grooves of the splined blade holder, and during the placement a depending arbor lock lug is positioned in one of the arbor locking notches of the saw shaft bearing bushing, until slide lock fingers, i.e. extending finger lands, again return to the grooves of the splined blade holder, resulting in the clearing of the depending arbor lock lug from the respective arbor locking notch, and the quick change mechanism is repositioned into its operating and locked position illustrated in FIG. 1; and FIG. 6 illustrates how a circular saw blade having a diamond shaped arbor receiving hole, is first fitted with an adapter to secure a splined arbor receiving hole subassembly, and this circular saw blade, so fitted with splines, is locked on to the saw shaft following the illustrated procedures presented in FIGS. 4 and 5.

DESCRIPTION OF THE PREFERRED EMBODIMENT

This quick change mechanism for circular saw blades 10, in the preferred embodiment illustrated in FIGS. 1 through 5, is arranged in a compact axial overall assembly 12, as shown in FIG. 1, ready for use in the small clearances that are available in hand held powered saws, not shown, except for the components thereof, of a saw drive shaft 14 and a bearing-bushing 16 of this shaft 14. Most of the components of this quick change mechanism 10, which are illustrated apart from one another in FIG. 2, are preassembled in a preassembly 18, as shown in FIG. 3. Thereafter, this preassembly 18 is secured by turning the installation bolt 20, using the allen wrench 22, fitted to the wrench receiving hole 24 in the tapered head 21, until the bolt 20 having external threads is firmly secured in the threaded hole 15 of the saw drive shaft 14, also referred to as being the arbor 14.

After the preassembly 18 is secured to create the compact overall assembly 12, shown in FIGS. 1, 4, and 5, as this preassembly 18 surrounds the end of the saw shaft 14, the quick change mechanism 10 is ready to receive a circular saw blade 26 having a splined arbor hole 28, with lands 30 and valley grooves 32, as illustrated in FIG. 4. Then this mechanism 10 receives the circular saw blade 26, as shown in FIG. 5, following its lowering, depressing, and then limited rotation, to place its lands 30 in an outside circumferential locking groove 34 on a hollow exteriorly splined blade holder 36, via an exacting fit.

A hollow internally splined slide lock 38 with extending finger lands 40, also referrred to as sliding lock fingers 40, moves under the force of the coiled spring 42, after the limited rotation has been completed of the circular saw blade 26, to place the extending finger lands 40 in the valley grooves 44 of the splined blade holder 36. Via this installation, the circular saw blade 26 is firmly positioned on the splined blade holder 36, locking this blade 26 both radially and axially.

To release the circular saw blade 26, when the blade 26 has stopped and the power is off, a release button 48 is depressed against the force of the coiled spring 42. This button 48 has a depending circular lip 45 about the centered access hole 46, which helps to position the coiled spring 42, in conjunction with a spring cavity 41, created in the tapered head 21 of the installation bolt 20, as shown in FIGS. 2 and 3. The inward movement of the release button 48, having depending spring legs 50 and extending feet 52 which are guided in foot grooves 54, formed in the valley grooves 44, with the extending feet 52 being held in the foot holder slots 56 on the interiors of the extending slide lock fingers 40, causes the splined slide lock 38 to move, thereby clearing its sliding lock fingers 40 from their circular saw blade 26 locking positions. Thereafter, this saw blade 26 is counter rotated until its lands 30 of the splined arbor hole 28 are in the valley grooves 44 of the splined blade holder 36. Then, with these lands 30 cleared, the axial removal of the circular saw blade 26 is quickly undertaken.

As shown in FIG. 2, any relative rotation between the splined blade holder 36 and the splined slide lock 38 is prevented by a travel limiting stud 60 of this slide lock 38 being confined within the width of a travel limiting notch 62 of this blade holder 36. Moreover, the relative axial movement between the blade holder 36 and the slide lock 38 is limited to a confined distance determined by the length of this travel limiting notch 62. Such axial movement is needed both to block and then to clear the access to the blade locking groove 34 of the splined blade holder 36, in respect to the axial movement of the sliding lock fingers 40 of the splined slide lock 38.

In addition to the release button 48 serving its operational function, it serves as the preassembly fastener 48, as shown in FIG. 3, holding the subassembly together, of: the splined blade holder; the splined slide lock; the installation bolt 20; the coiled spring 42; and the release button 48, which has its spring legs 50 formed at an eight degree outward angle, positioning the feet 52 in the foot holder slots 56, under the spring force of these angular depending spring legs 50.

As illustrated in FIGS. 1, 2, 3, 4 and 5, there is a depending arbor lock lug 66 on the splined slide lock 38, which, upon the depression of this slide lock 38, either by the axial movement of the circular saw blade 26 upon installaiton, or by the axial movement of the release button 48 upon removal of the circular saw blade 26, is moved into engagement with one arbor locking notch 68 of a group of them 68, which are radially spaced about the bearing-bushing 16 of the saw shaft 14. This engagement at this limited sequence time keeps the saw drive shaft 14 from turning when the circular saw blade 26, is either being locked in place, or unlocked and removed. When the circular saw blade 26 is locked in place, the splined slide lock 38 has moved, clearing this depending arbor lock lug 66 from any possible engagement with any of the arbor locking notches 68.

Also during cutting operations, the depending arbor lock lug 66 is ever ready to serve as a preventative lug 66, to prevent any depression of the release button 48. With the saw rotating rapidly there is no opportunity for the release button, if bumped, to be successful in creating the alignment of the depending arbor lock lug 66 with any one of the arbor locking notches 68. There cannot be any unintended release of the operating saw circular saw blade. The power saw must be stopped before the manipulation of the release button 48 may be successfully undertaken.

If, during operations, a circular saw blade 26 becomes stuck in a work piece being cut, no kick back occurs. This is insured by providing smooth surfaces on the underside of the head 21 of the installation bolt 20, and the countersunk bolt head smooth receiving surfaces 37 of the splined blade holder 36. Also the central bore 35 of this blade holder 36 is smooth, where it surrounds the arbor 14. Via this securement of the circular saw blade 26, with the quick change mechanism 10, when this blade 26 jams into the piece being cut, this mechanism 10 also stops rotating and slips relative to saw drive shaft 14 or arbor 14, and the installation bolt 20, which continue to rotate, until the power is cut off.

The compact axial arrangement of these components of this quick change mechanism 10 for circular saws, wherein portions overlap the saw drive shaft 14, makes it possible to install and to remove circular saw blades 26, where the axial clearance is very limited. In many hand held powered circular saw blade saws the axial clearance, in respect to blade guards and/or sawdust blower exits, is very limited, yet this mechanism 10 is very conveniently utilized.

Essentially, there is no change or very limited changes to be made in any production saw, now offered, to accommodate this quick change mechanism 10. Moreover, although in FIGS. 1 through 5, the circular saw blade 26 is illustrated as having a splined arbor hole 28, a diamond arbor hole 72 on a circular saw blade 26, as illustrated in FIG. 6, may be fitted with an adapter assembly 74. A disc 76 having a splined arbor hole 28 is placed on one side of the saw blade 26. Then on the opposite side of the saw blade 26, a diamond plate insert 78, having a central hole 80 to fit over the slide lock collar 82 with its sliding lock fingers 40 of the splined slide lock 38, is fitted to the diamond arbor hole 72. It is so positioned by using two spaced circular segments 84, which match portions of the disc 76. These segments 84 and the diamond plate insert 78 are secured together, as a positioning subassembly 86, as shown in the exploded view of FIG. 6, by using fasteners 88, which also join the disc 76, to complete the adapter assembly 74, by being first passed through the aligned holes 90 of like diameter, in both disc 76, and the subassembly 86.

This quick change mechanism for circular saw blades 20, is essentially conveniently utilized with all power tools turning circular saw blades 26, or other circular discs. When utilized, the circular saw blades 26 are installed or removed in seconds of time, by only using a person's hands and fingers. During sawing operations the circular saw blades 26 cannot be released. However, if a circular saw blade 26 becomes stuck in a work piece, there will be no kick back, as slippage occurs between the continuing revolving subassembly of the arbor 14, or saw drive shaft 14, and the installation bolt 20, and the stopped subassembly, of the circular saw blade 26 and compact overall assembly 12, of this quick change mechanism 10 for circular saw blades 26.

I claim:

1. A quick change mechanism, operable in seconds, to change rotatable work contacting members, such as circular saw blades with respect to the drive shafts of power tools, comprising, the preassembly of:
   (a) a splined slide lock having lands and grooves, with the lands extending as sliding lock fingers and having foot holder slots;
   (b) a splined circular saw blade holder for placement on the splined slide lock and inside the sliding lock fingers, and having a smooth centered hole, a blade locking groove, and foot and leg receiving grooves;
   (c) an installation bolt passed essentially through both the splined slide lock and the splined circular saw blade holder, having threads to secure it in a threaded hole of an arbor shaft, a head to be received in the smooth centered hole of the splined circular saw blade holder, a complementary centered hole to receive an allen wrench, and a centered cavity to position an end of a coiled spring;
   (d) a coiled spring for axial placement using the centered cavity of the installation bolt; and
   (e) a release button having depending spring legs and feet, and a centered hole to pass an allen wrench, is initially used as a fastener to hold this preassembly together, as it is lowered over the coiled spring with its spring legs extending beyond the installation bolt, and down in between the splined slide lock and the splined circular saw blade holder, utilizing the foot and leg receiving grooves on this blade holder, and then completing the subassembly, as the feet are positioned in the foot holder slots of this splined slide lock.

2. A quick change mechanism, as claimed in claim 1, comprising, in addition,
   the arbor drive shaft of a power saw having a central threaded hole to receive the installation bolt and also having a bearing-bushing positioned near the end of the arbor.

3. A quick change mechanism, as claimed in claim 1, wherein:
   the splined slide lock has a travel limiting stud; and
   the splined circular saw blade holder has a travel limiting notch to receive the travel limiting stud, whereby any possible relative rotational motion between this slide lock and this blade holder is prevented, and the intentional axial motion is limited between this slide lock and this blade holder.

4. A quick change mechanism, as claimed in claim 2, wherein:
   the splined slide lock has a depending arbor lock lug; and
   the bearing-bushing of the arbor has spaced arbor locking notches, whereby during the installation and removal of circular saw blades, the depending arbor lock lug is positioned in one of the spaced arbor locking notches to keep the arbor drive shaft from rotating.

5. In combination, a quick change mechanism, operable in seconds, to change circular saw blades with respect to the drive shafts of power tools, a circular saw blade, and an arbor drive shaft of a power saw, wherein the quick change mechanism has the preassembly of:
   (a) a hollow splined slide lock having internal lands and gooves with lands extending, as sliding lock fingers from a collar, and having foot holder slots on the interiors of the sliding lock fingers;
   (b) a hollow splined circular saw blade holder having external lands and grooves for placement on the collar of the hollow splined slide lock and inside the sliding lock fingers, and having a countersunk smooth centered hole formed as the hollow center, and outside circumferential circular saw blade locking groove, and leg and foot receiving grooves;
   (c) an installation bolt passed essentially through both the hollow splined slide lock and the hollow splined circular saw blade holder, having external threads to secure it in a threaded hole of an arbor drive shaft, a tapered head to be received in the countersunk smooth centered hole of the splined circular saw blade holder, a complementary centered hole to receive an allen wrench, and a centered cavity to position an end of a coiled spring;

(d) a coiled spring for axial placement using the centered cavity of the installation bolt; and (e) a release button having depending spring legs and feet, and a centered hole to pass an allen wrench, is initially used as a fastener to hold this preassembly together, as it is lowered over the coiled spring with its spring legs extending beyond the installation bolt, and down in between the splined slide lock and the splined circular saw blade holder, utilizing the foot and leg receiving grooves on this blade holder, and then completing the subassembly, as the feet are positioned in the foot holder slots of this splined slide lock;

and further wherein the arbor drive shaft of a power saw has:

(a) the arbor end having a threaded center hole to receive the installation bolt of the preassembly; and (b) a bushing-bearing; and further wherein the circular saw blade has a splined arbor hole with lands and grooves to complementary fit over the hollow splined circular saw blade holder and to depress the sliding lock fingers of the hollow splinded slide lock during the quick installation, to reach the outside circumferential circular saw blade locking groove, and thereafter be rotated to place the lands of the arbor hole in the locking groove, while clearing the grooves of this blade holder, whereby the sliding lock fingers, under the coiled spring force fill the grooves of the blade holder, and thereby complete the axial and radial locking about the splined arbor hole of the circular saw blade.

6. In the combination, of the quick change mechanism, drive shaft of a power tool, and a circular saw blade, as claimed in claim 5, wherein the circular saw blade splined arbor hole, with lands and grooves, is provided by an assembly of components interfitting with a diamond arbor hole of the circular saw blade, comprising: a circular plate with a splined arbor hole positioned on one side of the circular saw blade; a diamond plate with a central hole to clear the hollow spline slide lock and the hollow splined circular saw blade holder, and with outside diamond dimensions to complementary fit into the diamond arbor hole, positioned on the other side of the circular saw blade; and two spaced segments matching portions of the circular plate positioned adjacent the diamond plate; and fasteners and holes to join together the circular plate, the diamond plate, and the two spaced segments, as an assembly of components fitted to the diamond arbor hole of the circular saw blade.

* * * * *